UNITED STATES PATENT OFFICE.

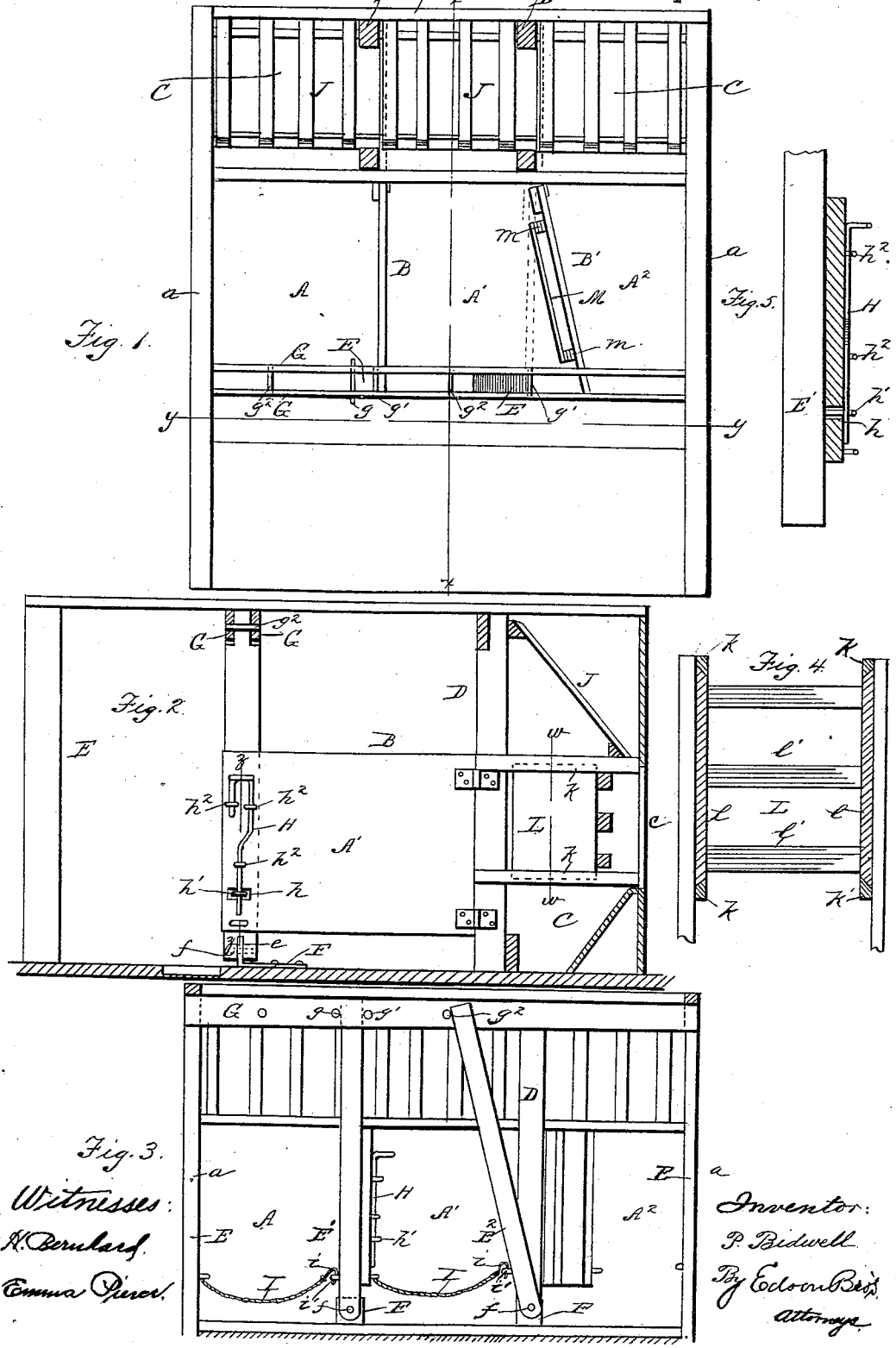

PORTER BIDWELL, OF McGREGOR, IOWA.

COW-STABLE.

SPECIFICATION forming part of Letters Patent No. 425,649, dated April 15, 1890.

Application filed March 10, 1888. Serial No. 266,874. (No model.)

*To all whom it may concern:*

Be it known that I, PORTER BIDWELL, a citizen of the United States, residing at McGregor, in the State of Iowa, have invented certain new and useful Improvements in Cow-Stables, of which the following is a specification, reference being had therein to the accompanying drawings.

My invention relates to improvements in cow-stalls especially adapted for stabling cows to be milked; and it consists of the peculiar construction, combination, and adaptation of parts, as will be hereinafter fully described, and particularly pointed out in the claim.

The primary object of my invention is to provide the stalls with adjustable partitions and standards, which can be easily and quickly adjusted by the milkman before entering the stall to increase the size thereof and give him additional room and a better side approach to the cow to be milked than is possible with stalls having fixed stationary partitions, whereby the milkman is enabled to work to better advantage, and the liability of upsetting the pail or vessel is diminished.

A further object of my invention is to provide the adjustable partitions of the stalls with devices for locking the same securely in place, to provide an adjustable rack at the front of the stall for increasing or shortening the length thereof, and with adjustable or removable lateral walls on the adjustable partitions for varying the width of the stall to thereby adapt the stall for stabling animals of different sizes.

In the accompanying drawings, Figure 1 is a horizontal sectional view through a series of stalls embodying my invention. Fig. 2 is a vertical longitudinal sectional view thereof on the line $x\ x$ of Fig. 1. Fig. 3 is a transverse sectional view on the line $y\ y$ of Fig. 1. Fig. 4 is a vertical detail sectional view on the line $w\ w$ of Fig. 2, taken transversely through one of the stalls to show the sliding adjustable rack therein. Fig. 5 is a vertical sectional view in detail on the line $z\ z$ of Fig. 2, to show the locking device for one of the adjustable partitions.

Referring to the drawings, in which like letters of reference denote corresponding parts in all the figures, A A′ A² designate a series of stalls constructed in accordance with my invention, the two end stalls A A² having the fixed side walls $a$, while between the several stalls are arranged a series of swinging partitions B B′. At the front of each stall is provided a manger C, of the ordinary class, and in the front wall of the stable adjoining the mangers are formed openings $c$, through which feed can be introduced in the mangers, as is obvious. The front part of the partitions B B′ between the stalls is made stationary, being fixed securely in place to upright posts D, as shown, while the adjustable sections of the partitions are hinged at their front ends to one of the posts D, so that they can swing laterally into the space occupied by an adjoining stall, the rear ends of the swinging adjustable partitions being confined in place by suitable locking devices.

E represents a series of uprights or posts arranged at the rear ends of the stalls, the two middle posts being arranged in juxtaposition to the rear ends of the swinging partitions B B′, so that said partitions can be detachably locked in place to the posts. These middle posts are designated by the letters E′ E², for the purpose of ready reference thereto, and said posts are made adjustable in planes at right angles to the line of movement of the adjustable partitions, in order that the posts E′ E² may not be in the way of the milkman in entering or leaving the stall to milk a cow. The posts E′ E² are provided in their lower ends with slots $e$, in which is fitted the upright end of angle-plates F, which are fixed to the floor of the stalls, and through said posts and upright arms of the angle-plates are passed pivot-pins $f$, to adapt the posts to be moved or swung across the ends of the stalls, as is obvious. The upper ends of the adjustable posts E′ E² are confined between a pair of parallel guide rods or bars G, which are arranged a short distance from one another to permit said posts to fit between them; and the posts are held in their vertical positions between two pins $g\ g'$, one of the pins $g'$ being removably secured in place to adapt the post to swing laterally toward a fixed pin $g^2$, arranged in the bars or rods G about midway across the stall, to limit the swinging movement of the post when turned from an upright to an inclined position.

In the free end of each adjustable partition is formed a transverse slot $h$, through which is adapted to pass a fixed keeper $h'$ on the upright $E'$ or $E^2$ when the partition is closed against said upright, and a vertically-sliding bolt H is guided in suitable guides $h^2$, so as to pass through the keeper $h'$, and thereby hold the partition in a closed position.

Ropes or chains I are stretched across the outer end of the stalls to prevent the animals confined therein from escaping, one end of said rope or chain being permanently connected with one of the adjustable partitions and the other end of the rope having a hook $i$, adapted to take into an eye $i'$ on the adjoining upright, as is obvious.

At the front end of each stall, over the manger therein, is arranged an inclined feed-rack J, which is elevated at a suitable distance to permit the animal in the stall to eat from the manger or trough without hinderance, each rack inclining toward the front of the stall and consisting of a series of parallel bars, which are suitably fixed in place.

On the opposing faces of the fixed front sections of the partitions to each stall is arranged a pair of ways or cleats $k\ k'$, which are arranged parallel with each other and separated a suitable distance to receive an adjustable rack L, which has flat side pieces $e$ and a series of transverse bars $e'$, secured to the side pieces. These side pieces are fitted between the cleats or ways, and the rack is adapted to slide lengthwise of the stall to lengthen or shorten the same.

On one or both lateral faces of either or both adjustable partitions B B' is fixed a removable lateral wall M, which is projected from said partition into the space occupied by the stall to narrow the same by means of a series of strips $m$, which are interposed between the wall and the partition. This wall and strips are detachably secured in place by any common fastenings, so that they can be easily removed, if desired.

The operation of my invention is obvious from the foregoing description, taken in connection with the drawings. When it is desired to milk a cow confined in one of the stalls, the sliding bolt H is lifted to release the partition B or B', which is then swung laterally into the space occupied by an adjoining stall to that in which the animal to be milked is confined, and the post or upright to which said partition has been secured is then moved laterally on its pivot, so as to permit free egress and exit to the stall and a better side approach to the animal to be milked, after which the partition and post are restored to their former positions. The vertically-sliding bolt is bent laterally at an intermediate point of its length, and at its upper end it has a thumb-piece for lifting it and with a depending guide-arm that operates in a staple, whereby the bolt is held in an elevated position without catches and can be readily forced home.

By the use of the adjustable rack L and lateral wall M the stall can be varied in size to adapt it to cattle of various sizes, so that the cow can be confined therein without danger of turning around and escaping, which is especially desirable in view of the fact that the animal is not tied by a halter, &c.

Having thus described my invention, what I claim as new, and desire to secure by Letters Patent, is—

In an animal-stall, a sliding rack L, arranged at the front of the stall above the manger thereof and having its sides supported in fixed guides K to slide endwise in the stall, substantially as and for the purpose described.

In testimony whereof I affix my signature in presence of two witnesses.

PORTER BIDWELL.

Witnesses:
   C. W. WALKER,
   H. H. CLARK.